United States Patent [19]

Furlow

[11] Patent Number: 5,066,407
[45] Date of Patent: Nov. 19, 1991

[54] PETROCHEMICAL RECOVERY MACHINE

[76] Inventor: George R. Furlow, 37,607 New River Rd., Geismar, La. 70734

[21] Appl. No.: 553,910

[22] Filed: Jul. 16, 1990

[51] Int. Cl.⁵ .......................... E02B 15/04; C02F 1/40
[52] U.S. Cl. .................................... 210/744; 210/776; 210/801; 210/804; 210/104; 210/242.3; 210/259; 210/283; 210/519; 210/521; 210/923
[58] Field of Search ............... 210/242.3, 776, 923, 210/259, 320, 519, 521, 533, 540, 801, 804, 744, 104, 265, 283, 290

[56] References Cited

U.S. PATENT DOCUMENTS

| | | | |
|---|---|---|---|
| 108,664 | 10/1870 | Wigner | 210/519 |
| 2,883,059 | 4/1959 | Puddington et al. | 210/519 |
| 3,219,190 | 11/1965 | Thune | 210/523 |
| 3,527,348 | 9/1970 | Lalonde et al. | 210/320 |
| 3,529,720 | 9/1970 | Chablaix | 210/123 |
| 3,613,891 | 10/1971 | Cloutier | 210/923 |
| 3,623,609 | 11/1971 | Ainlay | 210/923 |
| 3,656,624 | 4/1972 | Walton | 210/242.3 |
| 3,682,316 | 8/1972 | Waren | 210/242.3 |
| 3,690,464 | 9/1972 | Heinicke | 210/242.3 |
| 3,762,558 | 10/1973 | Anderson | 210/242.3 |
| 3,847,816 | 11/1974 | DiPerna | 210/242.3 |
| 3,862,040 | 1/1975 | Prens et al. | 210/253 |
| 3,884,807 | 5/1975 | Heddon | 210/104 |
| 3,933,654 | 1/1976 | Middlebeek | 210/521 |
| 3,966,615 | 6/1976 | Petchnl et al. | 210/242.3 |
| 4,132,652 | 1/1979 | Anderson et al. | 210/521 |
| 4,261,827 | 4/1981 | Bronner | 210/923 |
| 4,304,668 | 12/1981 | Meilna et al. | 210/242.3 |
| 4,372,854 | 2/1983 | Szereday | 210/242.3 |
| 4,381,994 | 5/1983 | Ayers | 210/120 |
| 4,400,274 | 8/1983 | Protos | 210/302 |
| 4,422,931 | 12/1983 | Wolde-Michael | 210/519 |
| 4,487,694 | 12/1984 | Brandt et al. | 210/242.3 |
| 4,554,074 | 11/1985 | Broughton | 210/519 |
| 4,851,133 | 7/1989 | Rymal | 210/776 |

FOREIGN PATENT DOCUMENTS

617376 7/1978 U.S.S.R. .

Primary Examiner—Stanley S. Silverman
Assistant Examiner—Christopher Upton
Attorney, Agent, or Firm—Reginald F. Roberts, Jr.

[57] ABSTRACT

Machinery and method for the removal, separation, and recovery of petrochemical oils from the surface of bodies of water. The machinery comprises a pickup unit, a first separator unit, a second separator unit, and a third separator unit. The pickup or skimmer unit is designed to operate independently of or in combination with the separator units, and is capable of being propelled by a powered vessel or of being anchored to receive the separated and recovered oil by channelling booms.

28 Claims, 7 Drawing Sheets

PETROCHEMICAL RECOVERY MACHINE

BACKGROUND OF THE INVENTION

The present invention relates to the separation of immiscible liquids. More particularly, the invention relates to removing and recovering liquid hydrocarbons from the surface of natural bodies of water.

As used herein, the terms "petrochemimcal." "oil," and "petrochemical oil" are defined to mean a substance isolated or derived from petroleum or natural gas, and are used interchangeably.

The term "sheen" is defined as an extremely thin film of oil.

The term "baffle" is defined as a plate, wall, screen, or other device to deflect, check, or regulate liquid flow.

The term "compound baffle" is defined as a baffle which defines more than one plane.

The term "solid baffle" is defined as a baffle without an opening therein.

The term "vented baffle" is defined as a baffle which includes at least one opening through which a liquid may flow through the baffle.

As the problem of oil spills has intensified, so too have efforts to provide technology to clean up such spills for the sake of environmental protection, and to recover the oil for the sake of energy and fuel conservation.

Various equipment has been devised for recovering low-density liquids such as oil from surface water. In most cases the recovery of the oil is required due to the adverse consequences of oil in a water supply. Probably the most widely-used apparatus for this purpose is skimming equipment, which separates the oil from the water by allowing the oil to float naturally to the surface of the water. Conventional skimming equipment uses a weir to separate the oil, which includes some water, from the remaining body of water. Permanent skimming equipment is commonly in place, for example, in waste-treatment ponds adjacent industrial and petrochemical facilities, to recover small quantities of oil discharged with water from the facilities before the water is returned to a river or other water supply.

When oil is unexpectedly encountered on the surface of a body of water, or is encountered in unusually high concentrations, it is often preferable to utilize a power-driven hull to assist in hydrocarbon collection. Such hulls have, for example, been provided with endless belts which are lowered into the water to pick up the oil, which is removed from the belt by a squeegee device or other suitable equipment. The oil thus collected is stowed in a compartment in the hull while the cleaned belt is returned to the water. An advantage of this system is that the hull can be easily steered or manipulated to desired locations on a body of water which evidences large oil slicks.

Hulls have also been employed for hydrocarbon-recovery systems utilizing a ring-shaped weir or boom to collect the oil within the perimeter of the boom and adjacent the hull, so that the oil can be retrieved at a location adjacent the hull. The oil and entrained water may be drawn into a holding tank in the hull. The oil may be allowed to rise to the surface of the water in the holding tank, so that the oil and some entrained water can be collected in a separate tank while most of the water originally drawn into the hull is recycled to the pond or body of water.

Another type of skimming device is disclosed by U.S. Pat. No. 4,597,863. This hull-like device does not utilize a floating weir, but uses instead the propeller of an engine to draw the surace oil-water mixture into the hull, where the water is separated by an oil-water separator within the vessel. This system has several significant advantages compared to a system which utilizes an external floating boom, particularly in that the hull may be easily manipulated to a location in the body of water where it is most effective. The system is also designed so that the oil slick on the surface of the water will be drawn to the hull.

Although the hydrocarbon system described by this patent has several important advantages over other prior-art hydrocarbon-recovery techniques, it is relatively complex and expensive. Moreover, the unit is intended to prevent a frontal wake and minimize "pushing" the surface water away from the hull during the skimming operation, and its efficiency is limited by either decreased skimming speed or the creation of a frontal wak leading to decreased oil-recovery performance.

By far the most important weakness in the prior art, however, is failure to provide a skimmer or pickup unit designed to operate independently of separator units by remote control, so that the oil collected by the skimmer unit can be collected and transported in containers to the separator unit or units, but which can optionally be connected to or integral with the separator unit. The skimmer unit should, moreover, be capable of being propelled by a powered vessel, or alternatively of being anchored to receive the oil in place, e.g., by channelling booms.

These problems and their solutions are addressed in the present application, which provides written and graphic disclosures of the present invention.

SUMMARY OF THE INVENTION

In general, the present invention in one aspect provides machinery and method for the removal, separation, and recovery of petrochemical oils from the surface of bodies of water. The machinery comprises a pickup unit, a first separator unit, a second separator unit, and a third separator unit.

The pickup unit comprises a substantially rectangular housing and floatation means for the housing. There is a receiving scoop for skimming an oil-water mixture from the surface of a body of water, and means for adjusting the depth of the receiving scoop below the surface of the water. The oil-water mixture from the receiving scoop is propelled forward by a paddle-wheel, which forms a seal on the contoured inside surface of the receiving scoop to prevent backflow of the mixture, the inner surface of the scoop being specifically contoured and adapted to mate with the blades of the paddle-wheel. The paddle-wheel is driven by a motor. There is a first pump well to contain the oil-water mixture picked up by the receiving scoop.

The first separator unit comprises a substantially rectangular housing. The unit includes an intake line for transferring the oil-water mixture from the first pump well of the pickup unit to the first separator unit, and a first pump for conveying the mixture through the intake line. There is a substantially horizontal, slotted first distribution manifold that is substantially perpendicular to and larger in cross section than the intake line, for distributing a stream of the oil-water mixture uniformly across the lower portion of the separator housing. The first slotted distribution manifold is adapted to direct the flowing stream of oil-water mixture slightly downward. The intake line is connected to the approximate middle of the first distribution manifold, substantially bisecting the first distribution manifold. First flow-balancing means are fastened to the first distribution manifold, to provide an even more uniform distribution of the oil-water mixture to the lover portion of the housing.

A first baffle downstream of the first distribution manifold is a compound overflow solid baffle having a lower vertical plate and an oblique upper plate. The lower vertical plate is secured to the bottom and side walls of the housing. The upper plate is generally directed toward the first distribution manifold. The height of the first baffle is approximately equal to the height of the stream of oil-water mixture leaving the slotted first distribution manifold. The first baffle is adapted to change the direction of flow of the stream of oil-water mixture to reverse and upward directions, thereby dividing the stream into an upper oil-rich stream and a lower water-rich stream.

An excess-oil diverter is disposed above and downstream of the first baffle, for receiving and conducting upward the oil-rich stream overflowing the first baffle.

A second baffle is disposed downstream of the excess-oil diverter. The second baffle is a compound, vertical, vented baffle secured to the bottom of the housing, and is adapted to directing the water-rich stream toward the bottom of the housing.

The unit includes a second pump well for receiving and containing the oil-rich stream. The second pump well comprises an upstream vertical wall having at its upper edge an oblique plate for receiving and downwardly directing the the oil-rich stream. The oblique plate is generally directed downward, and defines an acute angle with the upstream vertical wall.

A bypassed-water suction line extends vertically upward from the bottom of the second pump well to beyond the top of the well, for removing water from the second pump well.

There is a first detector which serves as a high-level water detector for detecting the highest acceptable water level. The first detector is mounted on the upstream vertical wall of the second pump well.

The second pump well includes a first splash-guard plate disposed between the upstream vertical wall and the first bypassed-water suction line. The first splash-guard plate is a vertical plate extending downward from the top of the housing to very nearly the bottom of the housing. The upstream vertical wall and the splash-guard plate define therebetween a passageway for the oil-rich stream overflowing the upstream vertical wall.

A third baffle, disposed downstream of the second baffle, extends obliquely upward from the bottom of the housing to slightly above the top of the second baffle. The third baffle is secured to the bottom and side walls of the housing, and defines an acute angle therewith. The third baffle is generally directed away from the first and second baffles, and is adapted to direct the water-rich stream upward.

A first stop-flow gate valve is mounted on a first inclined plate, for starting and stopping the flow of the oil-rich stream from the excess-oil diverter to the second pump well. The third baffle acts as a seal stop for the first stop-flow gate valve.

A first flapper valve prevents the oil-rich stream from flowing under the second pump well.

A second detector, which serves as a low-level water detector, is attached to the upstream vertical wall below the first detector. The second detector detects the lowest acceptable water level.

A fourth baffle, disposed downstream of the bypassed-water suction line and secured to the bottom and side walls of the second pump well, is substantially perpendicular to the bottom of the second pump well, and extends vertically upward to about the same distance above the bottom of the second pump well as the lower end of the first splash-guard plate. The fourth baffle provides a trap for bypassed water.

A third detector is attached to the fourth baffle approximately midway between the upper and lower edges of the baffle. The third detector activates suction on the bypassed-water suction line.

A first oil-suction line is provided for recovering the oil after it has been separated from the water, and a first water-discharge line for discharing water from the second pump well after the oil has been separated from the water.

A first float-level switch starts and stops suction on the first oil-suction line in accordance with the level of the oil in the second pump well.

A first air vent is provided to vent air from the first separator unit, thereby preventing a buildup of pressure in a first surge tank.

The second separator unit comprises a substantially rectangular housing containing a second distribution manifold to receive water from the second pump well via the first water-discharge line. A fourth detector serves as a high-level water detector, and detects the highest acceptable water level in the second separator unit. A fifth detector serves as a low-level water detector, and detects the lowest acceptable water level in the second separator unit.

A fifth baffle is similar in structure and function to the first baffle, and a sixth baffle is similar in structure and function to the second baffle. A second stop-flow gate valve is similar in structure and function to the first stop-flow gate vale. A third pump well is similar in structure and function to the second pump well. A second oil-suction line recovers any residual oil separated from the water in the second separator unit, and a second water-discharge line discharges water from the second separator unit. A second air vent prevents pressure buildup in the second surge tank of the second separator unit.

The third separator unit comprises a substantially rectangular housing containing a water-distribution manifold, a filter bed, and a third water-discharge line for discharging the filtered water.

The water-distribution manifold is closed at both ends, and receives water from the second water-discharge line. The distribution manifold is larger in cross section than the second water-discharge line, which is connected to the water-distribution manifold in a substantially perpendicular configuration which substantially bisects the water-distribution line.

A plurality of lateral hollow arms extend outward from the water-distribution manifold. One end of each lateral arm is connected to the water-distribution manifold. The other end of each arm is closed to seal the arm. The arms are smaller in cross section than the water-distribution manifold. Each lateral arm includes at least one opening in its lower surface for discharging water therefrom to the filter bed below, which receives and filters the water before discharging it through the a third water-discharge line.

In a second aspect the present invention provides a vessel and a method for skimming oil from the surface of a body of water. The vessel comprises an external housing, floatation means for the housing, a receiving scoop for skimming the oil from the surface of the water, and means for drawing the oil into the vessel while forming a seal on the inside surface of the receiving scoop to prevent backflow of the oil.

In a third aspect the invention provides apparatus and method for separating immiscible liquids of substantially different densities. The apparatus comprises an external housing; an intake line for the liquids; means for transporting the liquids through the intake line; and a substantially horizontal, slotted distribution manifold substantially perpendicular to and larger in cross section than the intake line, for distributing the liquids uniformly across the lower portion of the housing.

The distribution manifold directs the flow of the liquid stream slightly downward. The intake line substantially bisects the distribution manifold, to provide a uniform distribution of the liquid stream from the distribution manifold to the lower portion of the housing.

A first baffle downstream of the distribution manifold is characterized as a compound overflow solid baffle having a lower vertical plate and an oblique upper plate. The lover vertical plate is secured to the bottom and side walls of the housing. The upper plate is generally directed toward the distribution manifold. The height of the baffle is approximately equal to the height of the liquid stream leaving the slotted distribution manifold. The first baffle changes the direction of flow of the liquid stream to reverse and upward directions, thereby diving the stream into an upper stream enriched in the less-dense liquid and a lower stream enriched in the more-dense liquid.

The apparatus includes means for discharging the stream enriched in the less-dense liquid, and separate means for discharging the stream enriched in the more-dense liquid.

DETAILED DESCRIPTION OF THE INVENTION

Figure 1:
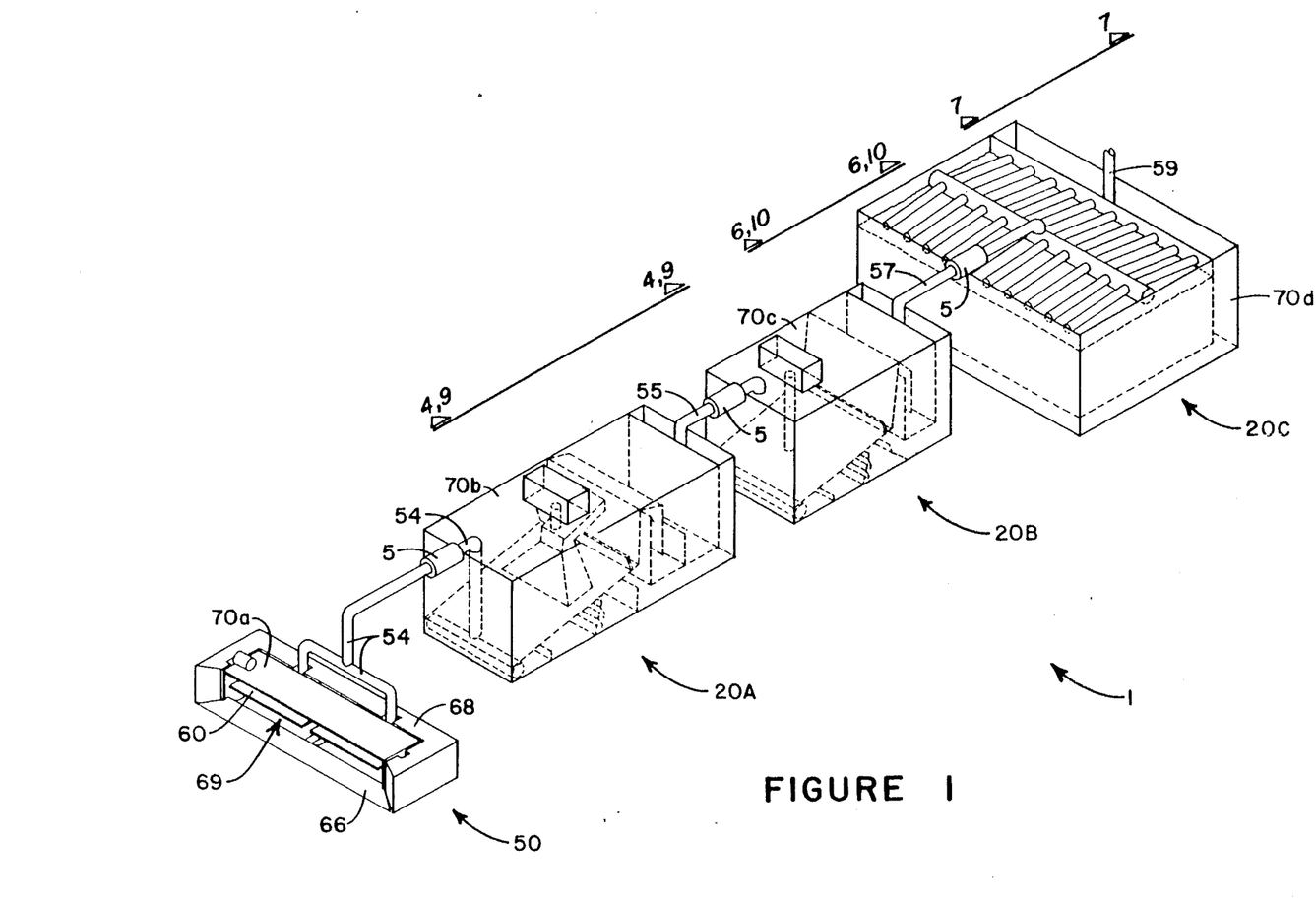
FIG. 1 is an isometric view of a petrochemical recovery machine made in accordance with the principles of the present invention.

More specifically, reference is made to FIG. 1, wherein is shown a petrochemical recovery machine, generally designated by the numeral 1, made in accordance with the principles of the present invention.

The machine comprises a pickup unit 50, a first separator unit 20a, a second separator unit 20b, and a third separator unit 20c. The pickup unit 50 and the third separator unit 20c are connected to the first and second separator units 20a and 20b, respectively. The first and second separator units 20a and 20b are connected to one another. The longitudinal axes of the pickup unit 50 and of the third separator unit 20c are substantially parallel. The longitudinal axes of the first and second separator units 20a and 20b are substantially coaxial. The longitudinal axes of the pickup unit 50 and of the third separator unit 20c are substantially perpendicular to the longitudinal axes of the first and second separator units 20a and 20b.

A mixture of oil and surface water is pulled into the pickup unit 50 through a receiving scoop 66 by a paddle-wheel 69 having blades 60 rotatably mounted on a revolving shaft 58. The pickup unit 50 is connected to the first separator unit 20a by a first transfer line 54 provided with a first pump 5 for transferring liquids from the pickup unit 50 to the first separator unit 20a. The first and second separator units 20a and 20b are connected to one another by a second transfer line 55 equipped with a second pump 5 for transferring liquids from the first to the second separator unit. The second separator unit 20b is connected to the third separator unit 20c by a third transfer line 57 provided with a third pump 5 for transferring liquids from the second to the third separator unit. Water from which oil has been separated in the first and second separator units 20a, 20b is discharged from the third separator unit 20c through a discharge line 59.

Figures 2, 3:
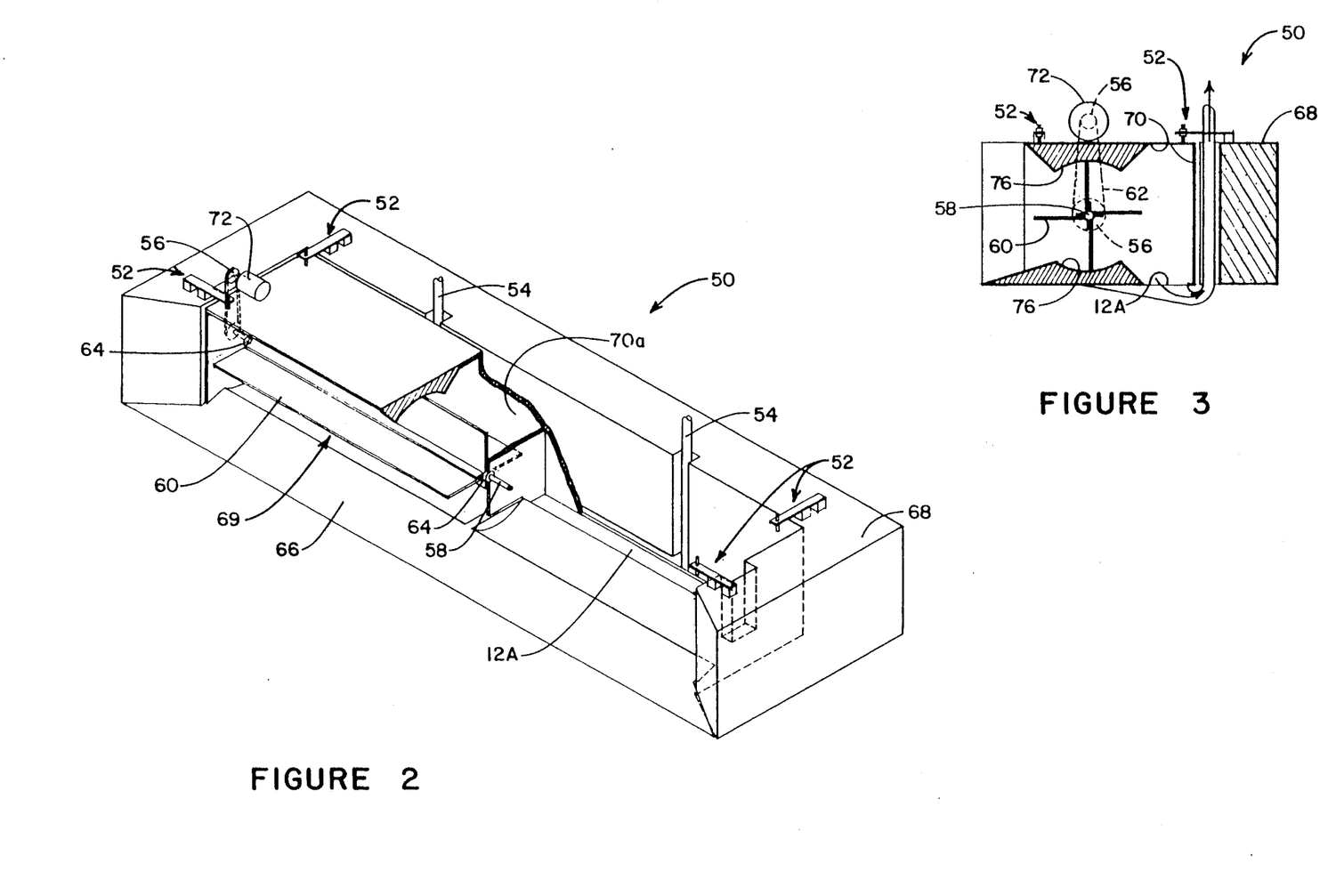
FIG. 2 is an isometric view of a oil-skimmer pickup unit made in accordance with the principles of the invention.
FIG. 3 is a cross-sectional view taken along a center line of the pickup unit shown in FIG. 2.

Reference is now made to FIGS. 2 and 3, wherein is shown a detailed view, in cross-section, of the pickup unit 50. The pickup unit 50 is provided with a substantially rectangular housing 70a, and with a floatation containment 68 to provide buoyancy and floatability. Floatation adjustments 52 are used to vary the depth of the scoop 66 below the surface of the water. The pickup unit 50 floats on the surface of a body of water with the support of the floatation containment 68. A mixture of oil and water is received by and over the receiving scoop 66. The oil-water mixture from the receiving scoop 66 is propelled forward by a paddle-wheel 69 comprising blades 60 rotatably mounted on a revolving shaft 58 supported by bearings 54. The shaft 58 is rotated by chain-sprockets 56 engaging chains 62 and driven by a motor 72. The paddle-wheel 69 forms a seal on the inside contoured surface of the receiving scoop 66 to prevent backflow of the oil-and-water mixture. As seen in FIG. 3, the upper and lower surfaces 76 of the scoop 66 are concave, and the radius of curvature of these surfaces 76 is approximately equal to the width of the paddle blades 60, four of which are disposed within the scoop 66. The blades 60 extend radially outward from the shaft 58. A first pair of substantially coplanar blades 60 are substantially perpendicular to a second pair of substantially coplanar blades 60. In combination, the four blades 60 form a seal with the curved inside surfaces 76 of the scoop 66. The geometry is such that, as the paddle-wheel 69 rotates, one pair of blades 60 is always in contact with the inside surfaces 76, thereby blocking the passageway between the upper and lower inside surfaces 76, preventing back-flow of oil, preventing an uncontrolled surge of oil and water from the outside body of water through the passageway e.g. by turbulence or wave action, and controlling the rate of intake of external oil and water from the body of water being skimmed. While it would of course be possible to provide more than four blades 60, any blades in excess of four would be neither necessary nor desirable. A first pump well 12a receives and contains the oil-water mixture picked up by the receiving scoop 66.

Figure 4:
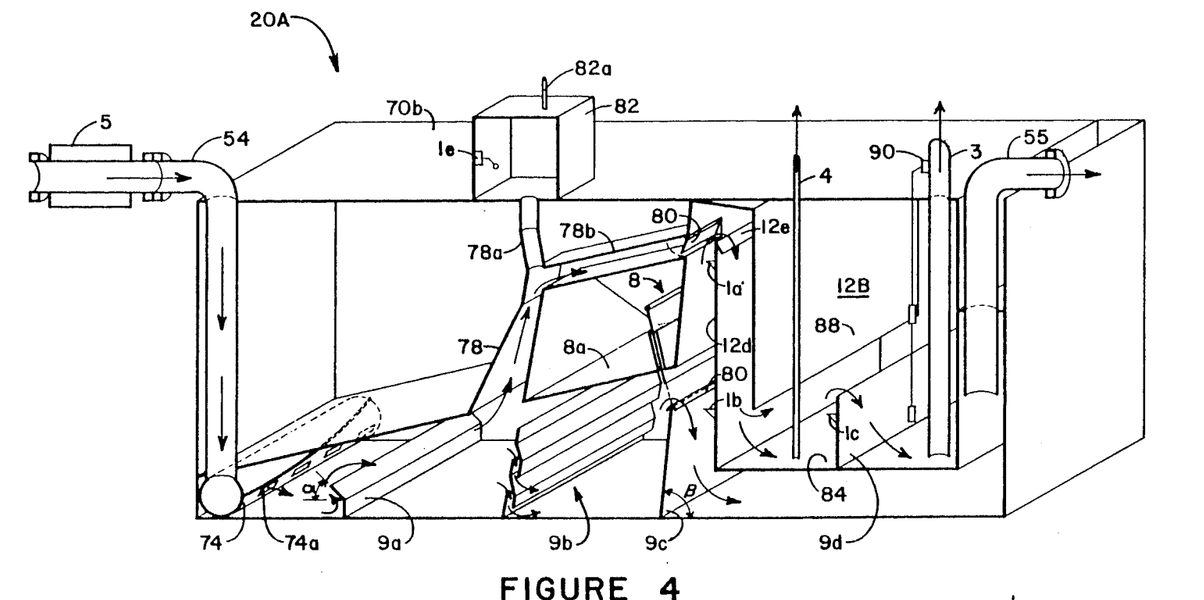
FIG. 4 is a cross-sectional view taken along a center line of a first separator unit made in accordance with the principles of the invention, showing the flow patterns during the separation phase of the operation.
Figure 9:
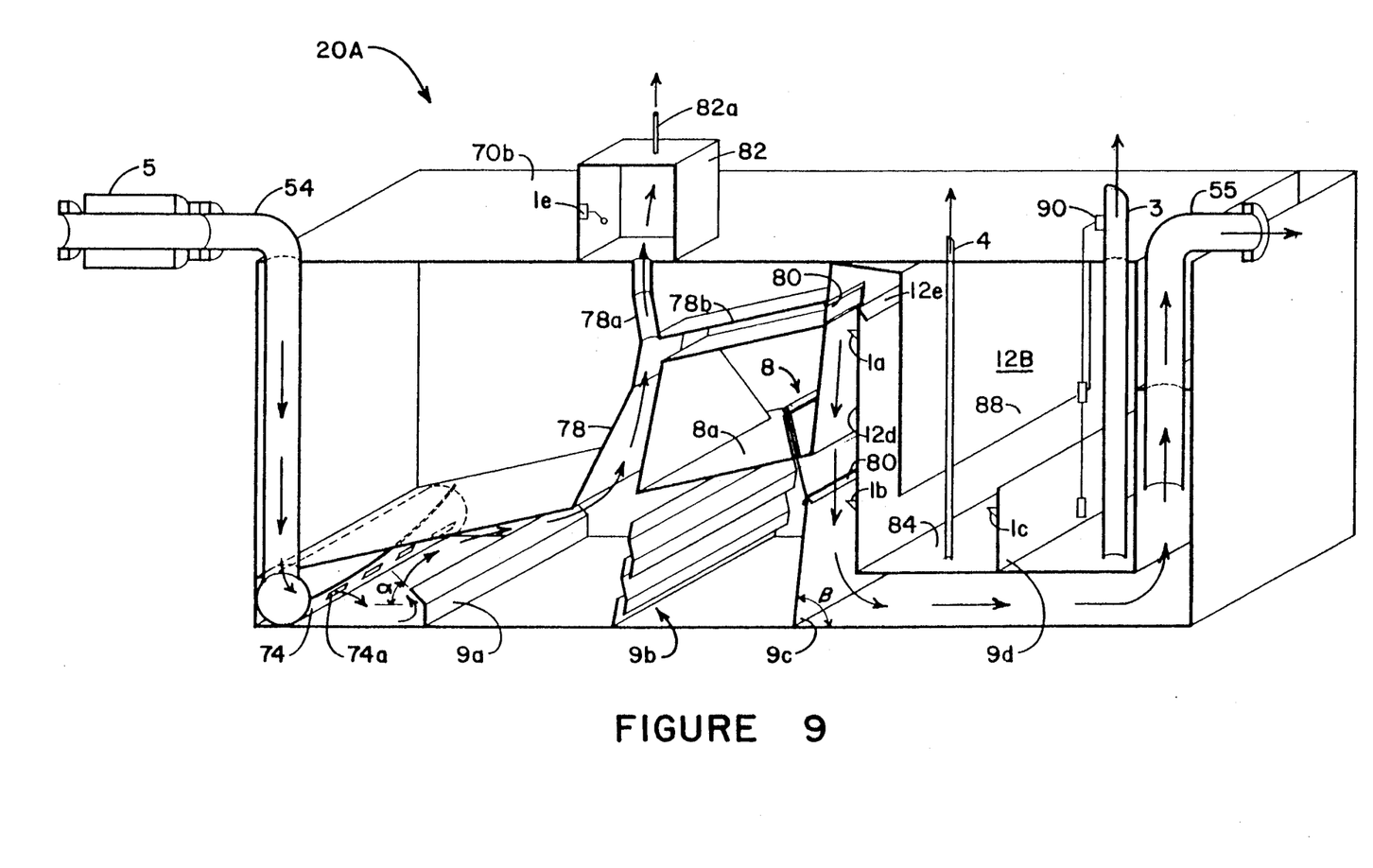
FIG. 9 is a cross-sectional view of the first separator unit, showing the flow patterns during the pump-down phase of the operation.

Reference is now made to FIGS. 4 and 9, wherein is shown a detailed view, in cross-section, of the first separator unit 20a during the separation and pump-down stages, respectively, with the directions of flow indicated by arrows.

The first separator unit 20a is provided with a substantially rectangular housing 70b. The unit 20a includes an intake line 54 for transferring the oil-water mixture from the first pump well 12a of the pickup unit to the first separator unit 20a, and a first pump 5 for conveying the mixture through the intake line 54. There is a substantially horizontal, slotted first distribution manifold 74 that is substantially perpendicular to and larger in cross section than the intake line 54, for distributing a stream of the oil-water mixture uniformly across the portion of the separator housing 70b.

Figure 5:
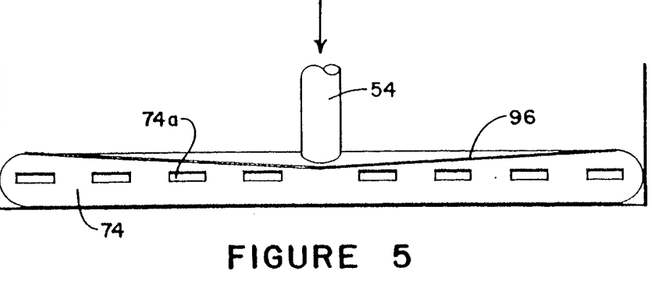
FIG. 5 is a front view of a distribution line made in accordance with the principles of the invention.

The structure of the first distribution manifold 74, and its connection with the intake line 54, are more clearly seen in FIG. 5, to which reference is now made. The first distribution manifold 74 includes a plurality of openings 74a along its length. Preferably, these openings are substantially rectangular, and are spaced apart substantially as shown. In order to provide an even more nearly uniform distribution of the oil-water mixture across the lower portion of the housing 70b, a first flow-balancer 96 is fastened to the exterior of the distribution manifold 74.

Returning now to FIGS. 4 and 9, it may be seen that the first separator unit 20a further comprises a first baffle 9a downstream of the first distribution manifold 74. The first baffle 9a has a lower vertical plate and an oblique upper plate. The lower vertical plate is secured to the bottom and side walls of the housing 70b. The upper plate is generally directed toward the first distribution manifold 74, and defines an acute angle alpha with the lower plate. The height of the first baffle 91 is approximately equal to the height of the stream of oil-water mixture leaving the slotted distribution line. The first baffle 91 changes the direction of flow of the stream to reverse and upward directions, thereby dividing the stream into an upper oil-rich stream and a lower water-rich stream.

An excess-oil diverter 78, mounted on a first inclined plate 81, is disposed above and downstream of the first baffle 9a, for receiving and conducting upward the oil-rich stream overflowing the first baffle 9a.

The first inclined plate 8a lies in a plane which defines an acute angle with the bottom of the housing 70b. The leading, upstream end of the plate 8a lies just above the first distribution manifold 74. The plate 8a extends slantingly upward to and above the third baffle 9c. There is an opening in the plate 8a between and above the first and second baffles 9a, 9b. This opening provides a passageway 78 for excess oil, the passageway leading upward, where it branches into a vertical first passageway 78a and an inclined, substantially horizontal passageway 78b. The first passageway 78a leads to the first surge tank 82 above the top of the housing 70b. The second passageeway 78b leads to the top of the upstream vertical wall 12d of the second pump well 12b.

A second baffle 9b is disposed downstream of the excess-oil diverter 78. The second baffle 9b is a compound, vertical, vented baffle secured to the bottom and side walls of the housing 70b, and is adapted to directing the water-rich stream toward the bottom of the housing.

The first separator unit 20a includes a second pump well 12b for receiving and containing the oil-rich stream. The second pump well 12b comprises an upstream vertical wall 12d having at its upper edge an oblique plate 12e for receiving and downwardly directing the oil-rich stream. The oblique plate 12e is generally directed downward, and defines an acute angle beta with the upstream vertical wall 12d.

A first bypassed-water suction line 4 extends vertically upward from the bottom of the second pump well 12b to beyond the top of the well, for removing water from the second pump well.

A first detector 1a, mounted on the upstream vertical wall 12d, serves as a high-level water detector, for detecting the highest acceptable water level.

The second pump well 12b includes a first splash-guard plate 88 disposed between the upstream vertical wall 12d and the bypassed-water suction line 4. The first upstream vertical wall 12d and the first splash-guard plate 88 define therebetween a passageway for the oil-rich stream overflowing the first upstream vertical wall.

A third baffle 9c extends obliquely upward from the bottom of the housing 70b to slightly above the top of the second baffle 9b. The third baffle 9c is adapted to direct the water-rich stream upward.

A first stop-flow gate valve 8 is mounted on the downstream end of the first inclined plate 8a, for starting and stopping the flow of the oil-rich stream from the excess-oil diverter 78 to the second pump well 12b. The third baffle 9c provides a seal stop for the first stop-flow gate valve 8.

A flapper valve 80 prevents the oil-rich stream from flowing under the second pump well during the pump-down phase of the operation.

A second detector 1b, which serves as a low-level water detector, is attached to the upstream vertical wall 12d below the first detector 1a. The second detector 1b detects the lowest acceptable water level.

A fourth baffle 9d, disposed downstream of the bypassed-water suction line 4 and secured to the bottom and side walls of the second pump well 12b, is a vertical baffle extending upward to about the same distance above the bottom of the second pump well as the lower end of the first splash-guard plate 88. In combination with the upstream vertical wall 12d and the bottom of the housing 70b, the fourth baffle 9d provides a trap for bypassed water.

A third detector 1c is attached to the fourth baffle 9d on the upstream side thereof approximately midway between the upper and lower ends of the baffle. The third detector 1c activates suction on the bypassed-water suction line.

A first float-level switch 90 starts and suction on a first oil-suction line 3 in accordance with the oil level in the second pump well 12b. The first oil-suction line 3 recovers the oil after it has been separated from the water, and a first water-discharge line 55 discharges the water to the second separator unit 20b.

Reference is now made to FIG. 4, in which is indicated the flow patterns during the separation phase of the operation.

The first separator unit 20a is preluded with water to provide a pressure point and shock balance at the point of entry.

A mixture of oil and water is pumped from the first pump well 12a of the pickup unit 50 through the intake line 54, and enters the first distribution manifold 74 disposed in the first separator unit 20a. From the first baffle 9a a first stream travels upward through the excess-oil diverter 78, and a second stream passes horizontally forward through the second baffle 9b.

The first stream passes substantially horizontally over the top of the first upstream vertical wall 12d of the second pump well 12b. In the meantime, the second stream, which is enriched in water and depleted of oil, passes over the third baffle 9c into a passageway defined by the third baffle 9c and the first upstream vertical wall 12d of the second pump well 12.

During this separation phase of the operation of the first separator unit 20a, the first stop-flow gate valve 8 and the first flapper valve 80 are open. When the second pump 5 begins to operate, an electrical signal causes the first stop-flow gate valve 8 and the first flapper valve 80 to close. The first pump 5 then operates at reduced speed, in order to maintain positive pressure and to compensate for pump down-time.

The first detector 1a starts the second pump 5 (FIGS. 1, 6, and 10), which pumps water through the first water-discharge line 55 to the second separator unit 20b. The flow patterns are then as shown in FIG. 9. When the second pump 5 has reduced the water level in the second pump well 12b to the level of the low-water level detector 1b, the level switch 90 stops the second pump 5 stops, and the first stop-flow flapper valve 8 opens. After a predetermined delay, the first flapper valve 80 opens, and the first pump 5 resumes pumping. The first flapper valve 80 remains closed for a predetermined interval after the first stop-flow gate valve 8 has opened, in order to allow a first surge tank 82 to flow down to a normal operating level. When high concentrations of oil are present, a bypass switch on an instrument panel (not shown) controls input to a bypass position, thereby closing the first stop-flow gate valve 8 and directing the flow of oil or the oil-rich stream into the second pump well 12b.

Figure 6:
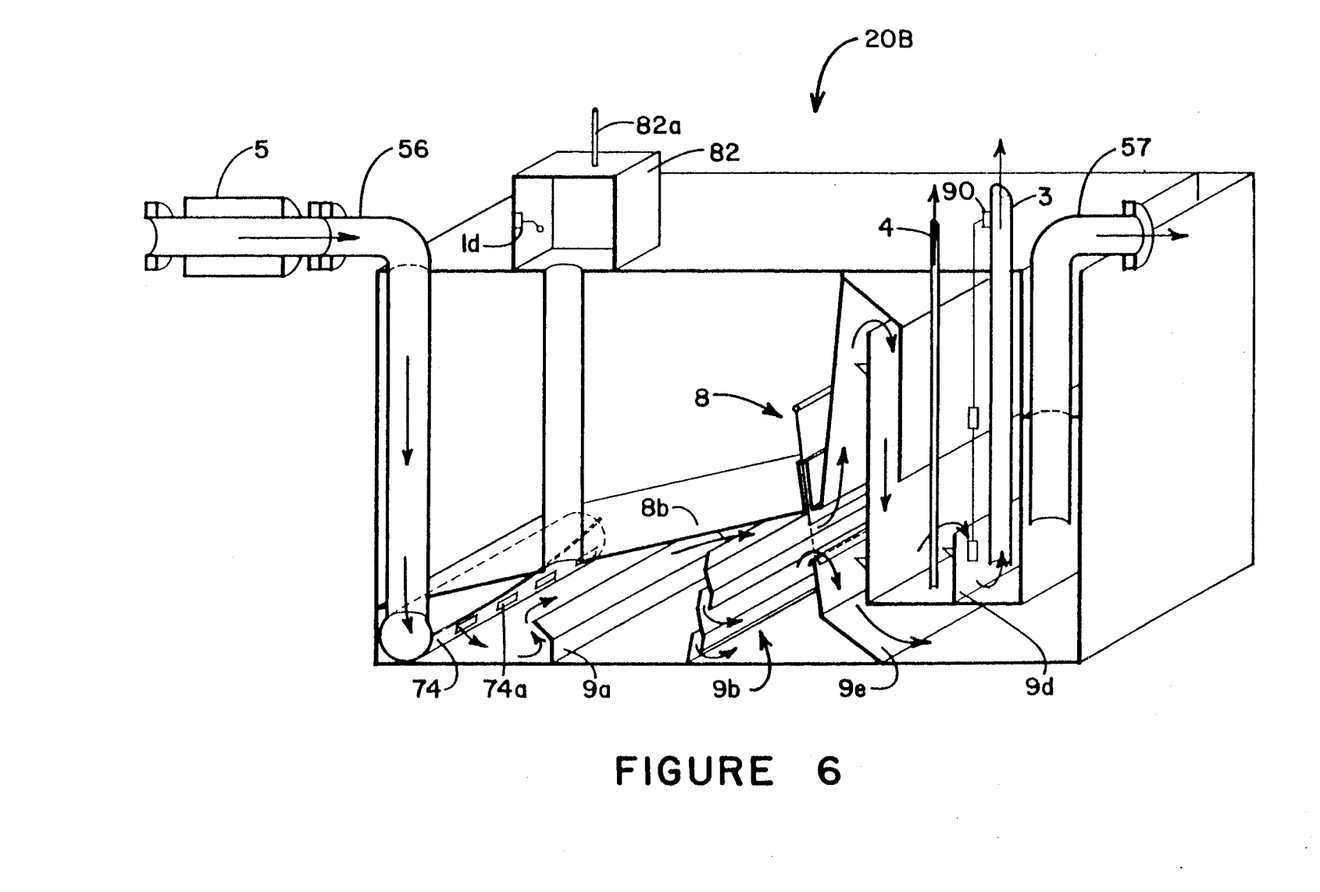
FIG. 6 is a cross-sectional view along a center line of a second separator unit made in accordance with the principles of the invention, showing the flow patterns during the separation phase of the operation.
Figure 10:
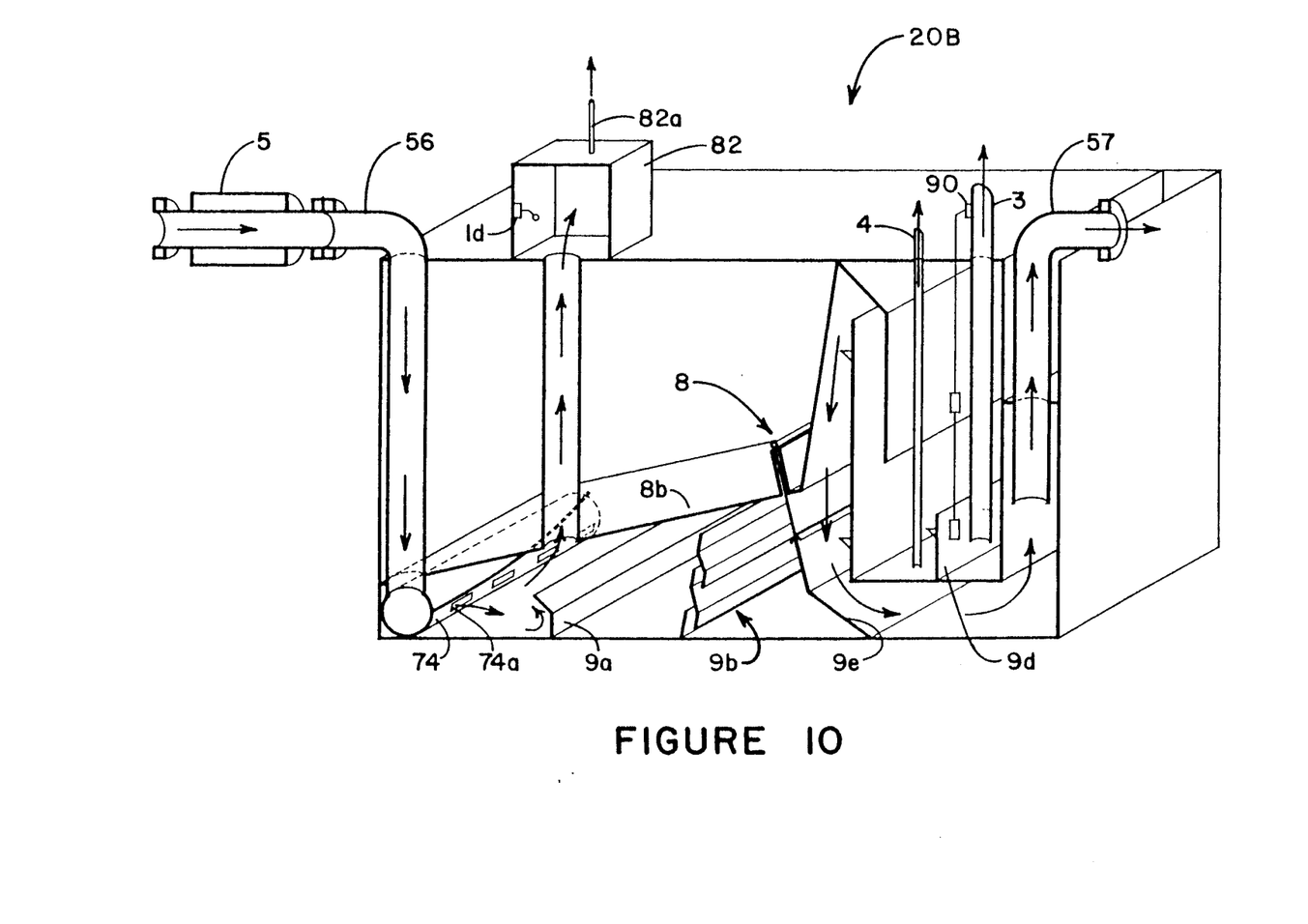
FIG. 10 is a cross-sectional view of the second separator unit, showing the flow patterns during the pump-down phase of the operation.

The construction and operation of the second separator unit 20b are similar to the construction and operation of the first separator unit 20a, except that the second separator unit 20b does not require an excess-oil diverter 78. The second separator unit 20b includes a second pump 5, a substantially rectangular housing 70c, a second distribution manifold 74, a second flow-balancer 96, a fifth baffle 9a, a sixth baffle 9b, a seventh baffle 9c, an eighth baffle 9d, a second stop-flow gate valve 8, a second flapper valve 80, a third pump well 12c, a fifth detector 1a, a sixth detector 1b, a seventh detector 1c, an eighth detector 1d, a second level-controller 1e, a second surge tank 82, a second air vent 82a, a second splash-guard plate 88, a second bypassed-water suction line 4, a second oil suction line 3, second upstream vertical wall 12d for the third pump well 12c, a second oblique plate 12e at the upper end of the upstream vertical wall 12d, a second float-level switch 90, a second inclined plate 8b, and a second water-discharge line 57.

Figure 7:
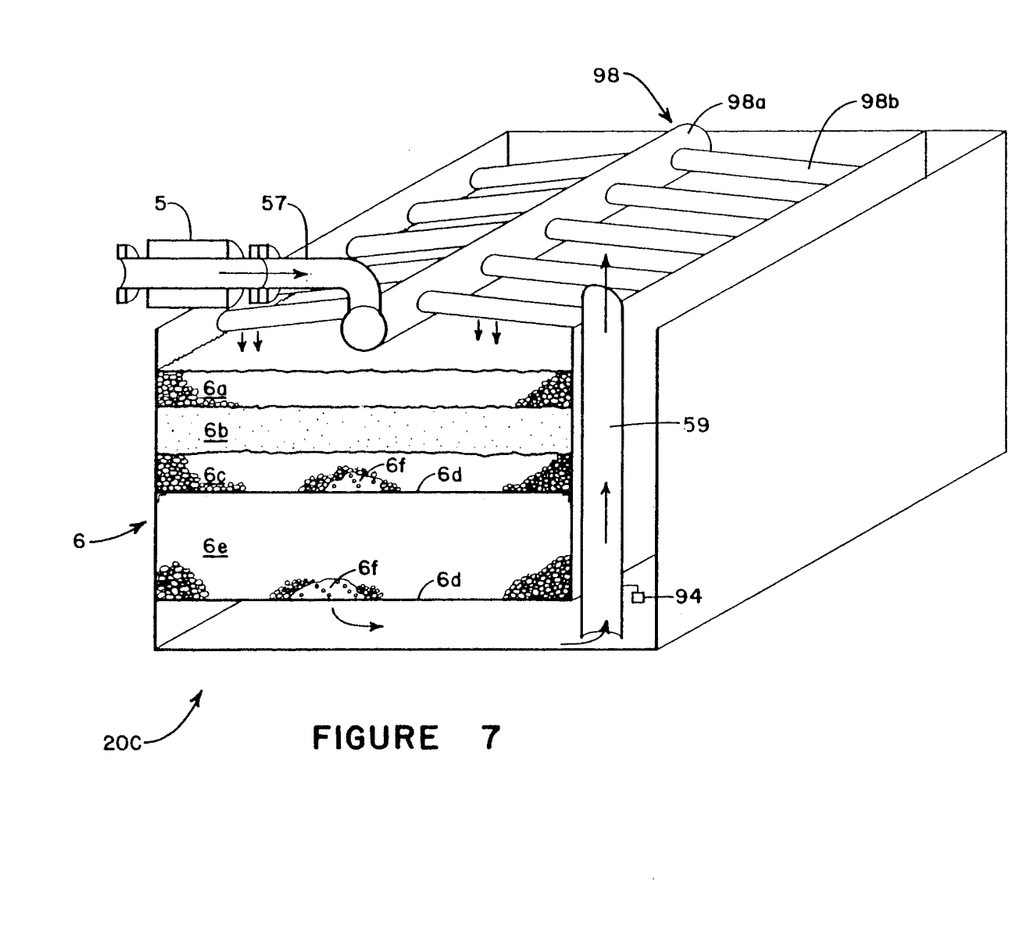
FIG. 7 is a cross-sectional view taken along a center line of a third separator unit made in accordance with the principles of the invention.
Figure 8:
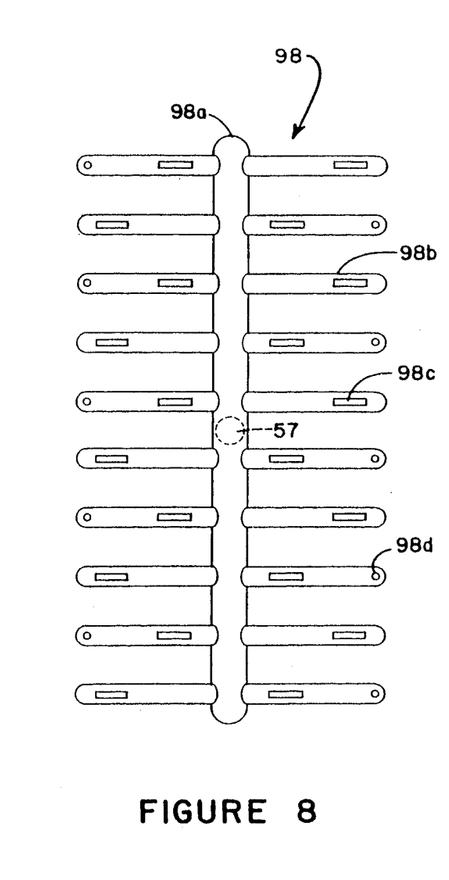
FIG. 8 is a bottom view of a water-distribution manifold made in accordance with the principles of the invention.

Reference is now made to FIG. 7, which depicts in cross section the details of the third separator unit 20c; and to FIG. 8, which shows the detailed construction of a water-distribution manifold 98 disposed within the third separator unit.

Water enters the third separator unit 20c through the second water-discharge line 57 and flows under pressure into the water-distribution manifold 98 through a water-distribution line 98a. The water-distribution line 98a is somewhat larger in cross section than the second water-discharge line 57, and is substantially bisected by the second water-discharge line.

The water-distribution line 98a is provided with laterally-extending arms 98b which are sealed at their outer ends. The arms 98b, which are somewhat smaller in cross section than the water-distribution line 98a, include openings 98c and 98d. The openings 98c release streams of water from the water-distribution line 98a. The openings 98d are for drainage of water retained in the arms 98b.

Water from the openings 98c and 98d flood a filter bed 6 disposed therebelow. The filter bed 6 comprises a first layer 6a of washed limestone particles having diameters of from about one-half inch to about one inch, a second layer 6b of coarse sand, a third layer 6c of washed limestone particles having diameters of from about one-half inch to about one inch, and a fourth layer 6e of limestone particles having diameters from about one inch to about one and one-half inches, with a first perforated plate 6d disposed between the third and fourth layers 6c and 6e, and a second perforated plate 6d supporting the bottom layer 6e. The plates 6d include perforations of approximately one-half inch in diameter.

The function of the filter bed 6 is to remove "sheen" from the water.

As the water flows through the filter bed 6 and accumulates under the bed, the accumulating water activates a float switch 94 which starts a high-volume discharge of the water through a third water-discharge line 59. The discharge may be by pump, by suction, by gravity, or by any other suitable means.

The water discharged from line 59 is returned to its source; or, when required, transferred to the upstream side of the pickup unit 50.

The filter bed 6 is readily and easily cleaned by backflushing the bed with a water solution of ammonia containing approximately thirty percent ammonia by weight.

I claim:
1. A petrochemical recovery machine, comprising:
(a) a pickup unit comprising
  (a1) a substantially rectangular housing;
  (a2) floatation means for the housing;
  (a3) a receiving scoop for skimming an oil-water mixture from the surface of a body of water;
  (a4) means for adjusting the depth of the receiving scoop below the surface of the water;
  (a5) a paddle-wheel for urging the mixture forward while forming a seal on the inside surface of the receiving scoop to prevent backflow of the mixture;
  (a6) a motor for driving the paddle-wheel; and

(a7) a first pump well for receiving and containing the oil-water mixture;

(b) a first separator unit comprising (b1) a substantially rectangular housing;

(b2) an intake line for transferring the oil-water mixture from the first pump well of the pickup unit to the first separator unit;

(b3) a first pump for conveying the oil-water mixture through the intake line;

(b4) a first substantially horizontal, slotted distribution manifold substantially perpendicular to and larger in cross-section than the intake line, for distributing a stream of the oil-water mixture uniformly across the lower portion of the housing, the slotted distribution manifold constructed and arranged to direct the flow of the oil-water mixture slightly downward, the intake line substantially bisecting the distribution manifold. for effecting a uniform distribution of the oil-water mixture from the distribution manifold to the lower portion of the housing;

(b5) first flow-balancing means fastened to the first distribution manifold, for effecting an even more uniform distribution of the oil-water mixture to the lower portion of the housing;

(b6) a first baffle downstream of the first distribution line, the first baffle constructed and arranged as a compound overflow solid baffle having a lower vertical plate and an oblique upper plate, the lower vertical plate being secured to the bottom and side walls of the housing, the upper plate generally directed toward the distribution manifold, the height of the baffle being approximately equal to the height of the stream of the oil-water mixture leaving the first distribution manifold, the first baffle constructed and arranged to change the direction of flow of the stream of oil-water mixture to reverse and upward directions, thereby dividing the stream into an upper oil-rich stream and a lower water-rich stream;

(b7) an excess-oil diverter above and downstream of the first baffle, for receiving and conducting upward the oil-rich stream overflowing the first baffle;

(b8) a second baffle downstream of the excess-oil diverter, the second baffle constructed and arranged as a compound, vertical, vented baffle secured to the bottom and side walls of the housing, the second baffle constructed and arranged to direct the water-rich stream toward the bottom of the housing;

(b9) a second pump well for receiving and containing the oil-rich stream, the second pump well comprising an upstream vertical wall including an oblique plate at its upper end for receiving and downwardly directing the oil-rich stream, the oblique plate generally directed downward and defining an acute angle with the upstream vertical wall;

(b10) a bypassed-water suction line extending vertically upward from the bottom of the second pump well to beyond the top of the second pump well, for removing water from the second pump well;

(b11) a first detector which serves as a high-level water detector, for detecting the highest acceptable water level, the first detector mounted on the upstream vertical wall of the second pump well;

(b12) a first splash-guard plate disposed between the upstream vertical wall and the bypassed-water suction line, the first splash-guard plate constructed and arranged as a vertical plate extending downward from the top of the housing to very nearly the bottom of the housing, the upstream vertical wall and the splash-guard plate defining therebetween a passageway for the oil-rich stream overflowing the upstream vertical wall;

(b13) a first stop-flow gate valve mounted on a first inclined plate, for starting and stopping the flow of the oil-rich stream from the excess-oil diverter to the second pump well;

(b14) a flapper valve for preventing the oil-rich stream from flowing under the second pump well;

(b15) a second detector which serves as a low-level water detector, the second detector being attached to the upstream vertical wall below the first detector, for detecting the lowest acceptable water level;

(b16) a third baffle downstream of the second baffle, the third baffle extending obliquely upward from the bottom of the housing to slightly above the top of the second baffle, the third baffle secured to the bottom and side walls of the housing and defining an acute angle with the bottom of the housing, the third baffle generally directed away from the first and second baffles, the third baffle constructed and arranged to direct the water-rich stream upward and to provide a seal stop for the first stop-flow gate valve, (b17) a fourth baffle disposed downstream of the bypassed-water suction line and secured to the bottom and side walls of the second pump well, the fourth baffle being substantially perpendicular to the bottom of the second pump well and extending vertically upward to about the same distance above the bottom of the second pump well as the lower end of the first splash-guard plate, the fourth baffle constructed and arranged to provide a trap for bypassed water;

(b18) a third detector, attached to the fourth baffle approximately midway between the upper and lower edges thereof, for activating suction on the bypassed-water suction line;

(b19) a first oil-suction line for recovering the separated oil;

(b20) a first float-level switch for starting and stopping suction on the first oil-suction line;

(b21) a first air vent to vent air from the first separator unit; and (b22) a first water-discharge line for discharging water from the second pump well;

(c) a second separator unit comprising (c1) a substantially rectangular housing;

(c2) a second distribution manifold and second flow-balancing means attached thereto, equivalent in structure and function to the first distribution manifold and first flow-balancing means, the second distribution manifold connected to the first water-discharge line, for receiving water from the second pump well by means of a second pump;

(c3) a fourth detector which serves as a high-level water detector, for detecting the highest acceptable water level in the second separator unit;

(c4) a fifth detector which serves as a low-level water detector, for detecting the lowest acceptable water level in the second separator unit;

(c5) a fifth baffle similar in structure and function to the first baffle;

13

(c6) a sixth baffle similar in structure and function to the second baffle;
(c7) a second stop-flow gate valve similar in structure and function to the first stop-flow gate valve;
(c8) a third pump well similar in structure and function to the second pump well;
(c9) a second oil-suction line for recovering residual oil separated from the water in the second separator unit;
(c10) a second water-discharge line, for discharging water from the second separator unit;
(c11) a second bypassed-water line similar in structure and function to the first bypassed-water line; and
(c12) a second air vent equivalent to the first air vent; and
(d) a third separator unit comprising
(d1) a substantially rectangular housing;
(d2) a water-distribution manifold closed at both ends, for receiving water from the second water-discharge line, the water-distribution manifold larger in cross-section than the second water-discharge line, the second water-discharge line connected to the water-distribution manifold in a substantially perpendicular configuration and substantially bisecting the water-distribution line;
(d3) a plurality of lateral hollow arms extending outward from the water-distribution manifold, one end of each lateral arm connected to the water-distribution manifold, the other end of each arm closed to seal the arm, the arms somewhat smaller in cross section than the water-distribution manifold, each lateral arm including at least one opening in its lower surface for discharging water therefrom;
(d4) a filter bed disposed beneath the lateral arms, to receive and filter the water discharged therefrom; and
(d5) a third water-discharge line for discharging the filtered water.

2. The petrochemical recovery machine recited in claim 1, wherein the lower vertical plate and the oblique upper plate comprising the first baffle define therebetween an acute angle having a magnitude of from about thirty degrees to about sixty degrees.

3. The petrochemical recovery machine of claim 1, wherein the magnitude of the acute angle defined by the third baffle and the bottom of the housing is from about seventy-five degrees to about eighty-five degrees.

4. The petrochemical recovery machine of claim 1, wherein the magnitude of the acute angle defined by the upstream vertical wall of the second pump well and the oblique plate at the upper edge of the vertical wall is from about twenty degrees to about forty degrees.

5. The petrochemical recovery machine of claim 1, wherein the second baffle includes a plurality of openings whereby liquid may flow through the baffle.

6. The petrochemical recovery machine of claim 1, wherein the straight-line distance separating the top of the second baffle from the first stop-flow gate valve is from about one-fourth to about one-half of the straight-line distance from the first baffle to the third baffle.

7. The petrochemical recovery machine of claim 1, wherein the bottom of the second pump well and the bottom of the housing of the first separator unit define therebetween a passageway for water.

8. The petrochemical recovery machine as recited in claim 1, wherein:

14

(b23) the pickup unit and the third separator unit are connected to the first and second separator units, respectively;
(b24) the first and second separator units are connected to one another;
(b25) the longitudinal axes of the pickup unit and of the third separator unit are substantially parallel;
(b26) the longitudinal axes of the first and second separator units are substantially coaxial; and
(b27) the longitudinal axes of the pickup unit and of the third separator unit are substantially perpendicular to the longitudinal axes of the first and second separator units.

9. The petrochemical recovery machine of claim 1, wherein the filter bed in the third separator unit comprises a first layer of limestone particles having diameters of from about one-half inch to about one inch, a second layer of coarse sand, a third layer of limestone particles having diameters of from about one-half inch to one inch, and a fourth layer of limestone particles having diameters of from about one inch to about one and one-half inches, with a first perforated plate disposed between the third and fourth layers, and a second perforated plate supporting the fourth layer.

10. A vessel for skimming oil from the surface of a body of water, comprising:
(a) an external housing;
(b) floatation means for the housing;
(c) a receiving scoop having an upper and a lower concave inside surface, for skimming the oil from the surface of the water;
(d) means for adjusting the depth of the receiving scoop below the surface of the water; and
(e) a paddle-wheel having at least four blades rotatably disposed within the receiving scoop, the blades mounted on and extending radially outward from a rotatable shaft, each blade having a width approximately equal to the radius of curvature of the inside surfaces of the receiving scoop, a first pair of substantially coplanar blades being substantially perpendicular to a second pair of substantially coplanar blades, the four blades being constructed and arranged so that as the paddle-wheel rotates, one pair of blades are always in contact with the upper and lower concave surfaces, thereby blocking a passageway defined by the upper and lower concave surfaces of the receiving scoop, forming a seal between the paddle blades and the scoop, preventing backflow of the oil, preventing uncontrolled surges of oil and water from the body of water through the passageway, and controlling the rate of intake of oil and water from the surface of the body of water being skimmed.

11. Apparatus for separating immiscible liquids having different densities, comprising:
(a) an external housing having upper and lower portions;
(b) an intake line for the liquids;
(c) means for conveying the liquids through the intake line;
(d) a substantially horizontal, slotted distribution manifold substantially perpendicular to and larger in cross section than the intake line, for distributing the liquids uniformly across the lower portion of the housing, the slotted distribution manifold constructed and arranged to direct the flow of the liquid slightly downward, the intake line substantially bisecting the distribution line, for effecting a uniform distribution of a liquid stream from the distribution line to the lower portion of the housing;

(e) a first baffle downstream of the distribution manifold, the first baffle constructed and arranged as a compound overflow solid baffle having a lower vertical plate and an oblique upper plate, the lower vertical plate being secured to the bottom and side walls of the housing, the upper plate being generally directed toward the distribution manifold, the height of the baffle being approximately equal to the height of the liquid stream leaving the slotted distribution manifold, the first baffle being constructed and arranged to change the direction of flow of the liquid stream to reverse and upward directions, thereby dividing the stream into an upper stream enriched in the less-dense liquid and a lower stream enriched in the more-dense liquid;

(f) first means for discharging the stream enriched in the less-dense liquid; and (g) second means for discharging the stream enriched in the more-dense liquid.

12. The apparatus of claim 11, wherein the lower vertical plate and the oblique upper plate comprising the first baffle define therebetween an acute angle having a magnitude of from about thirty degrees to about sixty degrees.

13. The apparatus of claim 11, further comprising: flow balancing means fastened to the distribution line, for effecting an even more uniform distribution of the liquids to the lower portion of the housing.

14. The apparatus of claim 11, further comprising: a diverter downstream of the first baffle, for receiving and conducting upward the stream enriched in the less-dense liquid overflowing the first baffle.

15. The apparatus of claim 14, further comprising: a second baffle downstream of the diverter, the second baffle being constructed and arranged as a compound overflow vented baffle secured to the bottom and side walls of the housing, the second baffle being constructed and arranged to direct the stream enriched in the more dense liquid toward the bottom of the housing.

16. The apparatus of claim 15, wherein the magnitude of the acute angle defined by the second baffle and the bottom of the housing is from about thirty degrees to about sixty degrees.

17. The apparatus of claim 15, wherein the magnitude of the acute angle defined by the third baffle and the bottom of the housing is from about seventy-five degrees to about eighty-five degrees.

18. The apparatus of claim 11, further comprising: a pump well for receiving and containing the stream enriched in the less-dense liquid, the pump well comprising an upstream vertical wall including an oblique plate at its upper edge, for receiving and downwardly directing the stream enriched in the less-dense liquid, the oblique plate generally directed downward and defining an acute angle with the upstream vertical wall.

19. The apparatus of claim 18, further comprising: a suction line extending vertically upward from the bottom of the well to beyond the top of the well, for removing and recovering the more-dense liquid from the well.

20. The apparatus of claim 19, further comprising: a splash-guard plate disposed between the upstream vertical wall of the pump well and the suction line, the splash-guard plate constructed and arranged as a vertical plate extending downward from the top of the housing to very nearly the bottom of the housing, the upstream vertical wall and the splash-guard plate defining therebetween a passageway for the stream overflowing the upstream vertical wall.

21. The apparatus of claim 19, further comprising: a flapper valve upstream of the pump well, for preventing the stream enriched in the less-dense liquid from flowing under the pump well.

22. The apparatus of claim 18, further comprising: a high-level detector for detecting the highest acceptable level of the more-dense liquid, the detector mounted on the upstream vertical wall of the pump well.

23. The apparatus of claim 22, further comprising: a stop-flow gate valve mounted on the upstream vertical wall of the pump well, for starting and stopping the flow from the diverter to the pump well.

24. The apparatus of claim 23, further comprising: a third baffle downstream of the second baffle, the third baffle extending obliquely upward from the bottom of the housing to slightly above the top of the second baffle, the third baffle being secured to the bottom and side walls of the housing and defining an acute angle with the bottom of the housing, the third baffle being generally directed away from the first and second baffles, the third baffle being constructed and arranged to direct the stream enriched in the more-dense liquid upward, and to provide a seal stop for the stop-flow gate valve.

25. The apparatus of claim 18, further comprising: a low-level detector for determining the lowest acceptable level of the more-dense liquid, the detector mounted on the upstream vertical wall of the pump well.

26. The apparatus of claim 11, wherein the less-dense liquid is a petrochemical oil and the more-dense liquid is water.

27. A method for removing, separating, and for recovering petrochemical oils from the surface of bodies of water, comprising the steps of:

(a) skimming the surace layer of oil and entrained water from the surface of the body of water utilizing a unit comprising
  (a1) an external housing;
  (a2) floatation means for the housing;
  (a3) a receiving scoop for skimming an oil-water mixture from the surface of a body of water;
  (a4) means for adjusting the depth of the receiving scoop below the surface of the water;
  (a5) a paddle-wheel for urging the mixture forward while forming a seal on the inside surface of the receiving scoop to prevent back-flow of the mixture;
  (a6) a motor for driving the paddle-wheel; and
  (a7) a first pump well for receiving and containing the oil-water mixture;

(b) transferring the oil-water mixture from the first pump well of the pickup unit to a first separator unit comprising
  (b1) an external housing;
  (b2) an intake line for transferring the oil-water mixture from the pickup unit to the first separator unit;
  (b3) a first substantially horizontal, slotted distribution manifold substantially perpendicular to and larger in cross section than the intake line, for distributing a stream of the oil-water mixture uniformly across the lower portion of the housing, the slotted distribution manifold being constructed and arranged to direct the flow of the oil-water mixture slightly downward, the intake line substantially bisecting the distribution manifold for effecting a uniform distribution of the oil-water mixture from the distribution manifold to the lower portion of the housing;

(b4) a first baffle downstream of the distribution manifold, the first baffle constructed and arranged as a compound overflow solid baffle having a lower vertical plate and an oblique upper plate, the lower vertical plate being secured to the bottom and side walls of the housing, the upper plate generally directed toward the distribution manifold, the height of the baffle being approximately equal to the height of the stream of the oil-water mixture leaving the slotted distribution manifold, the first baffle being being constructed and arranged to change the direction of flow of the stream of oil-water mixture to reverse and upward directions, thereby dividing the stream into an upper oil-rich stream and a lower water-rich stream;

(b5) an excess-oil diverter above and downstream of the first baffle, for receiving and conducting upward the oil-rich stream overflowing the first baffle;

(b6) a second baffle downstream of the excess-oil diverter, the second baffle being constructed and arranged as a compound vertical vented baffle secured to the bottom and side walls of the housing, for directing the water-rich stream toward the bottom of the housing;

(b7) a second well for receiving and containing the oil-rich stream, the second well comprising an upstream vertical wall including an oblique plate at its upper end for receiving and downwardly directing the oil-rich stream, the oblique plate generally directed downward and defining an acute angle with the upstream vertical wall;

(b8) a bypassed-water suction line extending vertically upward from the bottom of the second well to beyond the top of the well, for removing water from the second well;

(b9) a first detector which serves as a high-level water detector, for detecting the highest acceptable water level, the first detector mounted on the upstream vertical wall of the second well;

(b10) a splash-guard plate disposed between the upstream vertical wall and the bypassed-water suction line, the splash-guard plate being constructed and arranged as a vertical plate extending downward from the top of the housing to very nearly the bottom of the housing, the upstream vertical wall and the splash-guard plate defining therebetween a passageway for the oil-rich stream overflowing the upstream vertical wall;

(b11) a stop-flow gate valve mounted on an an inclined plate for starting and stopping the flow of the oil-rich stream from the excess-oil diverter to the second well;

(b12) a flapper valve for preventing the oil-rich stream from flowing under the second well;

(b13) a second detector which serves as a low-level water detector, the second detector being attached to the upstream vertical wall below the first detector, for detecting the lowest acceptable water level;

(b14) a third baffle downstream of the second baffle, the third baffle extending obliquely upward from the bottom of the housing to slightly above the top of the second baffle, the third baffle secured to the bottom and side walls of the housing and defining an acute angle with the bottom of the housing, the third baffle generally directed away from the first and second baffles, the third baffle being constructed and arranged to direct the water-rich stream upward and to provide a seal stop for the first stop-flow gate valve;

(b15) a fourth baffle disposed downstream of the bypassed-water suction line and secured to the bottom and side walls of the second well, the fourth baffle being substantially perpendicular to the bottom of the second well and extending vertically upward to about the same distance above the bottom of the second well as the lower end of the first splash-guard plate, to provide a trap for bypassed water;

(b16) a third detector, attached to the fourth baffle approximately midway between the upper and lower ends thereof, for activating suction on the bypassed-water suction line;

(b17) a first oil-suction line for recovering the separated oil;

(b18) a float-level switch for starting and stopping suction on the oil-suction line;

(b19) a first air vent to vent air from the housing of the first separator unit; and (b20) a first water-discharge line for discharging water from the second well;

(c) processing the oil-water mixture in the first separator unit, thereby obtaining a first stream containing mostly oil and a second stream containing mostly water;

(d) recovering the oil-rich first stream through the first oil-suction line;

(e) transferring the water-rich second stream to a second separator unit comprising (e1) an external housing;

(e2) a second distribution manifold for receiving water from the first water-discharge line, the second distribution manifold being eauivalent in structure and function to the first distribution manifold;

(e3) a fourth detector which serves as a high-level water detector, the fourth detector equivalent in structure and function to the first detector;

(e4) a fifth detector which serves as a low-level water detector, the fifth detector equivalent in structure and function to the second detector;

(e5) a fifth baffle similar in structure and function to the first baffle;

(e6) a sixth baffle similar in structure and function to the second baffle;

(e7) a second stop-flow gate valve similar in structure and function to the first stop-flow gate valve;

(e8) a second flapper valve similar in structure and function to the first flapper valve;

(e9) a well similar in structure and function to the second well;

(e10) a second bypassed-water line similar in structure and function to the first bypassed-water suction line;

(e11) a second oil-suction line similar in structure and function to the first oil-suction line;

(e12) a second air vent similar in structure and function to the first air vent; and (e13) a second water-discharge line for discharging water from the second separator unit;

(f) processing the water-rich stream from the first separator unit in the second separator unit, thereby obtaining a third stream of essentially pure oil and a fourth stream of essentially pure water;

(g) transferring the stream of essentially pure water to a third separator unit comprising (g1) an external housing;

(g2) a water-distribution manifold closed at both ends, for receiving water from the second water-discharge line, the water-distribution manifold larger in cross section than the second water-discharge line, the second water-discharge line connected to the water-distribution manifold in a substantially perpendicular configuration and substantially bisecting the water-distribution manifold;

(g3) a plurality of lateral hollow arms extending outward from the water-distribution manifold, one end of each lateral arm connected to the water-distribution manifold, the other end of each arm closed to seal the arm, the arms smaller in cross section than the water-distribution line, each lateral arm including at least one opening in its lower surface for discharging water therefrom;

(g4) a filter bed disposed beneath the lateral arms, to receive and filter the water discharged therefrom; and (g5) a third water-discharge line for discharging the filtered water.

28. A method for separating immiscible liquids having different densities, comprising the steps of:

(a) providing an external housing and an intake line for the liquids;

(b) conveying the liquids through the intake line to a substantially horizontal, slotted distribution manifold larger in cross section than the intake line, and being constructed and arranged to direct the liquid flow slightly downward;

(c) distributing the liquids through the distribution manifold uniformly across the lower portion of the housing;

(d) conveying the liquids above a first baffle downstream of the distribution manifold, the first baffle being constructed and arranged as a compound overflow solid baffle having a lower vertical plate and an oblique upper plate, the lower vertical plate being secured to the bottom and side walls of the housing, the upper plate generally directed toward the distribution manifold, the height of the baffle being approximately equal to the height of the liquid stream leaving the slotted distribution manifold, the first baffle being constructed and arranged to change the direction of flow of the liquid stream to reverse and upward directions, thereby dividing the stream into an upper stream enriched in the less-dense liquid and a lower stream enriched in the more-dense liquid;

(e) discharging the stream enriched in the less-dense liquid; and (f) separately discharging the stream enriched in the more-dense liquid.

* * * * *